United States Patent [19]

Klauke et al.

[11] 3,934,781
[45] Jan. 27, 1976

[54] SOLDERING BATH FOR FLUXLESS ULTRASONIC SOLDERING

[75] Inventors: Günter Klauke; Rüediger Marziniak; Günter Güerke, all of Munich, Germany

[73] Assignee: Siemens Aktiengesellschaft, Berlin & Munich, Germany

[22] Filed: Sept. 12, 1974

[21] Appl. No.: 505,333

[30] Foreign Application Priority Data
Sept. 18, 1973  Germany............................ 2346993

[52] U.S. Cl................................. 228/37; 228/262
[51] Int. Cl.²......................................... B23K 1/08
[58] Field of Search .......... 118/400, 421; 228/1, 36, 228/37, 110, 262

[56] References Cited
UNITED STATES PATENTS
3,752,381   8/1973   Watson .................................. 228/1
3,833,163   9/1974   Denslow et al. ........................ 228/1

Primary Examiner—Al Lawrence Smith
Assistant Examiner—James G. Smith
Attorney, Agent, or Firm—Hill, Gross, Simpson, Van Santen, Steadman, Chiara & Simpson

[57] ABSTRACT

The invention relates to a soldering bath for fluxless soldering purposes, consisting of a vessel containing the molten solder or a channel carrying molten solder, with several sonotrodes passing through the base of said vessel or channel.

10 Claims, 4 Drawing Figures

SOLDERING BATH FOR FLUXLESS ULTRASONIC SOLDERING

BACKGROUND OF THE INVENTION

1. Field of the Invention

The object of the invention is to provide a solder bath which is also suitable for the dip-tinning of elongated components. In particular, the solder bath should be of such a nature that within the workpiece dipping or transit zone the molten solder is uniformly pervaded by ultrasonic waves. Cancellation phenomena as a consequence of interference stemming from different sonotrodes or the walls of the vessel, are avoided.

2. Prior Art

In the German Auslegeschrift No. 2,107,862 a solder bath having a vessel comprising a sonotrode extending from the base of the vessel and affixed thereto by means of a collar and a set of sealing sleeves wherein the sonotrode is located in the neighborhood of the plane of a node of oscillation. By means of this design of the sonotrode seals at the point of penetration of the base, the ultrasonic oscillations produced by the sonotrode are insulated from the base of the vessel so that interference phenomena and damping in the molten solder are prevented. Solder baths of this kind are used, for example, for the fluxless soldering of small components which are dipped into a solder bath through which the ultrasonic waves are transmitted. This method of soldering makes it possible to produce a firmly adhering tinned coating on the components which are to be soldered without the need for a flux and without the associated disadvantages such as subsequent rinsing away of flux residues and damage to components due to flux vapor. In a solder bath of this kind, however, it is not possible to satisfactorily solder long narrow components such as pin strips and plug strips in the manner hereinbefore described because the wide sonotrodes which this necessitates result in a non-uniform amplitude distribution over their end faces and therefore also within the solder located above or flowing over the end faces of the sonotrodes. A non-uniform amplitude distribution precludes the development of a locally required cavitation effect at the locale of the component being soldered, resulting in the occurrence of faults in the solder application to the component.

U.S. Pat. No. 3,266,136 depicts a solder bath in which several sonotrodes are extended through the base of a solder channel. Each sonotrode is surrounded by a seal at a point at which it penetrates through the base. In one embodiment, the sonotrodes are coupled with a common oscillator plate from which the acoustic waves are radiated into the molten solder. A plate of this kind, however, has its own oscillatory characteristics wherein, even assuming that the sonotrodes oscillate co-phasally, a non-uniform amplitude distribution develops in the solder melt. An arrangement of this kind, because of the seal which each sonotrode requires and the other fixing elements, necessitates a larger interval between the individual sonotrodes; even if the common oscillator plate is dispensed with. This results in the development of acoustic difficiency zones in the solder melt within the spaces between the sonotrodes.

The German Offenlegungsschrift No. 1,597,015 depicts a device for radiating ultrasonic oscillations in liquid media. The device comprises a bath vessel having several sonotrodes extending through the base of the vessel, each equipped with an ultrasonic head. The ultrasonic heads are connected in parallel in the excitation circuit so as to oscillate co-phasally. However, here again the sonotrodes are spaced far apart. Because of this and of the nature of the method by which the sonotrodes are taken through the base of the vessel, the co-phasality of the ultrasonic oscillations within the bath liquid, engendered by the parallel arrangement, is disturbed by heterodyning effects.

SUMMARY OF THE INVENTION

The invention relates to a set of sonotrodes, located in the neighborhood of the plane of their nodes of oscillation, attached together by a web and combined into a single component, and wherein the corresponding acoustic heads connected to the sonotrodes, have a common oscillatory circuit. Through this design and arrangement of the sonotrodes, a uniform amplitude distribution over the end faces of the sonotrodes is achieved in the neighborhood of the soldering and cavitation zone within the solder melt. Because of the fact that the sonotrodes are attached to one another by a web in the neighborhood of the plane containing their nodes of oscillation, it is possible to combine them into a single component and thus to operate them co-phasally at a very close spacing in relation to one another, such as a spacing on the order of less than 0.3 mm. The web, located in the neighborhood of the plane containing the nodes of oscillation of the sonotrodes, has no undesirable influence on the sonetrodes. Following the principle in accordance with the invention, it is possible to arrange a plurality of closely contiguous sonotrodes in a row or in a block such that the molten solder such as tin oscillates co-phasally in the proximity of the soldering or cavitation zone. In a bath of this kind, therefore, elongated components and for that matter larger flat components can be properly soldered without any need for a flux.

It is particularly advantageous to form the sonotrodes which are attached together by a web, from a block. The block is divided by slots extending parallel to the direction of oscillation of the sonotrodes and taken down to the web or webs, into several identically shaped sonotrodes. Each of the thus formed sonotrodes is a section of a block common to all the sonotrodes. The "sonotrode block" possesses a fixing shoulder surrounding it, which is disposed in the region of the webs and the plane containing the nodes of oscillation of all the sonotrodes, and is clamped to the base of the vessel or channel by means of two sealing sleeves which produce vibrational and acoustic insulation. Through this method of attachment of the sonotrode or sonotrode block to the base of the vessel, a closely spaced arrangement of the sonotrodes and at the same time a good sealing and insulation of the sonotrodes vis-a-vis the vessel base is achieved.

DESCRIPTION OF THE PREFERRED EMBODIMENT

Figure 1:
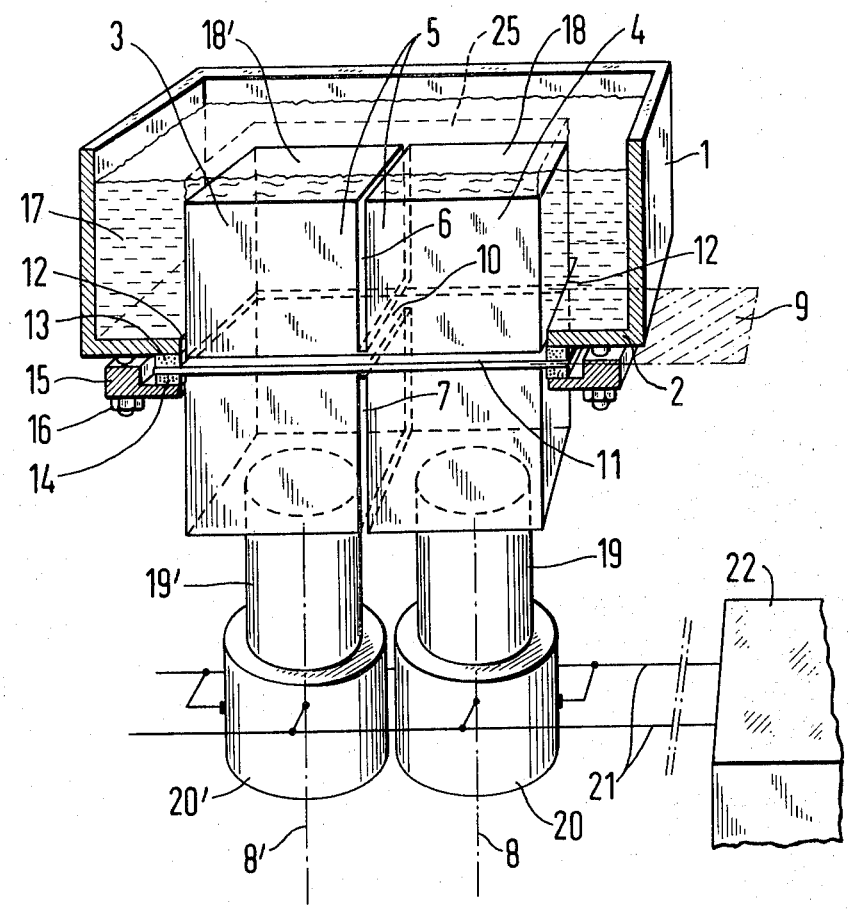
FIG. 1 is a cross sectional diagrammatic view of a solder bath vessel comprising two sonotrodes extending through a base of the vessel connected to two corresponding acoustic heads in accordance with the principals of the invention.

FIG. 1 illustrates a solder bath vessel 1 comprising two sonotrodes 3 and 4 extending through a base 2 of the vessel 1. The sonotrodes are formed from a common block 5 by the formation of two slots 6 and 7. The slots extend parallel to a direction of oscillation 8, 8' of the sonotrodes and are so arranged that the sonotrodes 3 and 4 have identical forms. The depth of the slots 6 and 7 is so dimensioned that in the neighborhood of one of the oscillatory node planes of the two sonotrodes, illustrated at 9 in a partial chain-dotted fashion, a web 10 is produced by which the two sonotrodes are attached together. Because the web is located in the proximity of a plane of the respective nodes of oscillation of the sonotrodes, the two sonotrodes do not affect each other. A fixing shoulder 11 surrounds the two sonotrodes; it is also located approximately at the plane 9 containing the nodes of oscillation of said sonotrodes. The shoulder is held at both ends in sleeves 13 and 14 by means of a clamp 15 and a plurality of set-screws 16. The fixing shoulder is used in association with the sleeves and the clamp to seal the sonotrodes and secure them in antivibration fashion in the neighborhood of an opening 12 in the base 2 of the solder bath 1. A molten solder 17, such as tin, contained in the vessel 1, covers end faces 18 and 18' of each of the sonotrodes 3 and 4; wherein, a soldering zone is located above the end faces of the two sonotrodes. The sonotrodes 3 and 4 are connected to an acoustic head 20, 20' by means of coupling elements 19 and 19'. The acoustic heads are designed in the present example as piezoceramic oscillators. They are arranged in parallel in an energizing circuit 21 of an ultrasonic generator 22 so that the sonotrodes oscillate co-phasally. The solder bath, illustrated purely schematically here may be provided with a cooling blower for cooling the coupling elements 19 and 19'. In this fashion, the heat transfer to the solder heads 20 and 20' is avoided. Furthermore, the solder bath has thermostatically controlled heating.

The shoulder 11, common to both the sonotrodes, will advantageously likewise be formed from the common block 5.

Figure 2:
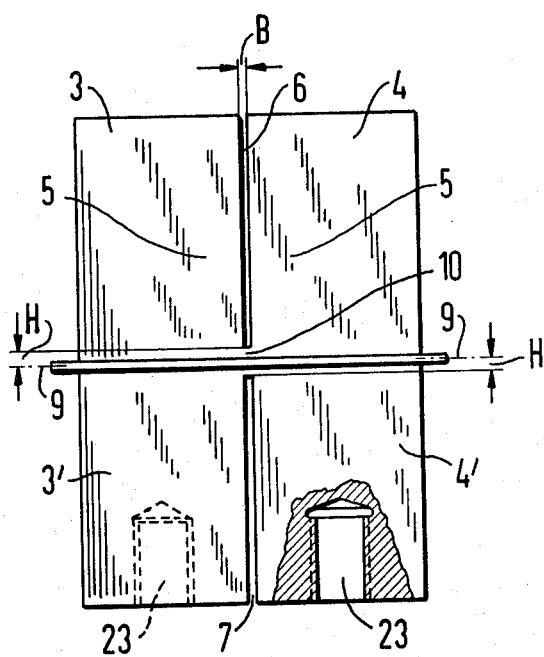
FIG. 2 is a diagrammatic front view of two sonotrodes in accordance with the principals of the invention.
Figure 3:
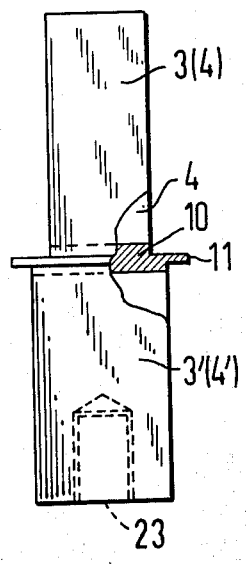
FIG. 3 is a diagrammatic side view of two sonotrodes in accordance with the principals of the invention.

In FIGS. 2 and 3, two sonotrodes 3 and 4, formed from the block 5, have been shown in front and side elevation. The width B of the slots 6, 7 should be no more than 0.3mm. The base 3' and 4' of each sonotrode may be given a wider design to act as a coupling section, accommodating the coupling, cooling and transmission elements 19 and 19'. Threaded bores are provided to receive coupling pins belonging to the coupling elements.

Tests have shown that the height H of the web 10 to either side of the plane 9 containing the nodes of oscillation, should be no more than 5 and preferably, at a frequency of 20 KHz, 3 millimeters.

Figure 4:
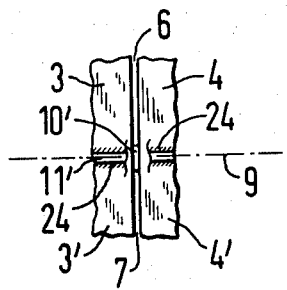
FIG. 4 is a diagrammatic view of two sonotrodes designed as separate components conductive to the attachment of the two by a resistance welding operation in accordance with the principals of the invention.

As best indicated at FIG. 4, it is also possible to design the sonotrodes 3 and 4 as separate components conducive to the attachment of the two by a resistance welding operation, such as interposing a web in the form of a metal foil. However, it will equally suffice simply to press the web 10' between the two sonotrodes. An arrangement of this kind, however, creates difficulties; a fixing device is required and the procedure involves considerable outlay and utilizes more space. Here, again, a shoulder 11' can take the form of a collar which is then attached by welding to the sonotrodes, as illustrated at 24. This embodiment, however, as best seen at FIG. 4, involves a higher outlay so that the embodiment shown in FIGS. 2 and 3 takes preference.

Correspondingly, arrangements with more than two sonotrodes may be formed. It is essential however that individual sonotrodes are acoustically virtually decoupled from one another and therefore operate in the manner of several independent systems. It is possible in this way to so equip virtually every elongated solder bath with sonotrodes, that the cavitation zone of the bath, as shown in broken line at 25 in FIG. 1, has a very largely uniform amplitude distribution. The close disposition of the sonotrodes makes it possible to transmit a greater acoustic power to the solder bath than previously possible. Furthermore, a particular advantage resides in the fact that because of the larger effective acoustic radiating area, a larger number of miniature components can be tinned in a fluxless fashion, in a single operation.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the following claims.

What is claimed is:

1. A solder bath for fluxless ultrasonic soldering comprising a vessel for holding molten solder and having a base, at least two sonotrodes, an acoustic head associated with each of said sonotrodes, a common oscillatory circuit for said acoustic heads so that each of the sonotrodes has at least one node of oscillation, a web having a width of at most 0.3 mm, said web interconnecting said sonotrodes at a common plane of the nodes of oscillation of said sonotrodes and spacing the sonotrodes apart by a distance no greater than 0.3 mm, said sonotrodes extending through said base into the bath so that the sonotrodes are in co-phasial operation and provide the bath with an enlarged cavitation zone having a uniform amplitude distribution.

2. A solder bath according to claim 1, wherein said web is a foil attached between said sonotrodes.

3. A solder bath according to claim 1, wherein said web and sonotrodes are a portion of a single block with the web being defined by at least one slot extending inward from each of a pair of opposite faces of said block and parallel to the direction of oscillation.

4. A solder bath according to claim 3, wherein the height of said web is at most 10 mm.

5. A solder bath according to claim 3, wherein the acoustic heads operate each of said sonotrodes at a frequency of 20 KHz and the web has a height of 6 mm.

6. A solder bath according to claim 3, wherein a fixing shoulder surrounds the sonotrodes at the common plane of the nodes of oscillation, and wherein said vessel includes means engaging said fixing shoulder to secure the sonotrodes in the base of the vessel in an antivibration fashion.

7. An ultrasonic bath comprising a vessel for holding a bath and having a base, single block having at least one slot extending inwardly from each of a pair of opposite faces to form at least a pair of sonotrodes interconnected by an integral web and spaced apart no greater than 0.3 mm, each of said sonotrodes having an acoustic head associated therewith and a common oscillatory circuit for said acoustic heads, said slot being dimensioned so that the web is disposed at a common plane of a node of oscillation of each of the sonotrodes and said block being mounted on the vessel with the sonotrodes extending through the base and into the bath whereby the sonotrodes are co-phasially operated to provide the bath with an enlarge cavitation zone having a uniform amplitude distribution.

8. An ultrasonic bath according to claim 7, wherein said block has a fixing shoulder surrounding the sonotrodes at approximately the common plane of the node of oscillations for said sonotrodes, and wherein said vessel includes means engaging said shoulder for securing the block on the base in an antivibrational fashion.

9. An ultrasonic bath according to claim 8, wherein the height of the web is at most 10 mm.

10. An ultrasonic bath according to claim 7, wherein said bath is a bath of molten solder so that fluxless soldering occurs therein.

* * * * *